United States Patent
Tayama et al.

(10) Patent No.: US 6,805,833 B2
(45) Date of Patent: Oct. 19, 2004

(54) APPARATUS FOR ENHANCED PURIFICATION OF HIGH-PURITY METALS

(75) Inventors: Kishio Tayama, Akita (JP); Toshiaki Hodozuka, Akita (JP)

(73) Assignee: Dowa Mining Co., Ltd., Tokyo (JP)

( * ) Notice: Subject to any disclaimer, the term of this patent is extended or adjusted under 35 U.S.C. 154(b) by 20 days.

(21) Appl. No.: 10/336,498

(22) Filed: Jan. 2, 2003

(65) Prior Publication Data

US 2003/0150293 A1 Aug. 14, 2003

Related U.S. Application Data

(62) Division of application No. 10/060,580, filed on Jan. 30, 2002, now abandoned.

(51) Int. Cl.$^7$ .................................................. C21C 7/10
(52) U.S. Cl. ...................................... 266/208; 266/905
(58) Field of Search .................... 75/367, 407; 266/208, 266/905

(56) References Cited

U.S. PATENT DOCUMENTS

| | | | |
|---|---|---|---|
| 4,695,319 A | | 9/1987 | Miura et al. |
| 6,231,637 B1 | * | 5/2001 | Tayama et al. ............... 75/367 |
| 6,444,164 B2 | * | 9/2002 | Tayama et al. ............. 266/208 |
| 2003/0145684 A1 | * | 8/2003 | Tayama et al. ............... 75/367 |

FOREIGN PATENT DOCUMENTS

| | | |
|---|---|---|
| EP | 0 047 665 A | 3/1982 |
| JP | 10-121163 A | 5/1998 |
| JP | 2001 221888 A | 8/2001 |
| SU | 1 010 148 A | 4/1983 |

OTHER PUBLICATIONS

Database WPI Section Ch, Derwent Publications Ltd., Class M25, Abstract of SU 299 559 A12/1972).

* cited by examiner

*Primary Examiner*—Scott Kastler
(74) *Attorney, Agent, or Firm*—Frishauf, Holtz, Goodman & Chick, P.C.

(57) ABSTRACT

A 99.99% pure indium feed is charged into crucible 8 and heated to 1250° C. by upper heater 6 in a vacuum atmosphere at $1 \times 10^{-4}$ Torr, whereupon indium evaporates, condenses on the inner surfaces of inner tube 3 and drips to be recovered into liquid reservoir 9 in the lower part of tubular member 11 whereas impurity elements having lower vapor pressure than indium stay within crucible 8. The recovered indium mass in liquid reservoir 9 is heated to 1100° C. by lower heater 7 and the resulting vapors of impurity elements having higher vapor pressure than indium pass through diffuser plates 12 in the upper part of tubular member 11 to be discharged from the system whereas the indium vapor recondenses upon contact with diffuser plates 12 and returns to liquid reservoir 9, yielding 99.9999% pure indium while preventing the loss of indium.

13 Claims, 1 Drawing Sheet

APPARATUS FOR ENHANCED PURIFICATION OF HIGH-PURITY METALS

This application is a divisional application of Ser. No. 10/060,580, filed on Jan. 30, 2002, now abandoned.

BACKGROUND OF THE INVENTION

This invention relates to an enhanced purification method by which a high-purity metallic indium feed with a purity of about 99.99% (4N) is further purified to give metallic indium with a purity of about 99.9999% (6N) or higher and which is also applicable for such enhanced purification of antimony, zinc, tellurium, magnesium, cadmium, bismuth and silver (which are hereunder referred to as similar metals). The invention also relates to an apparatus for purification that is used to implement the method.

Indium is generally produced as a minor amount component of zinc concentrates, so in zinc metallurgy, it is recovered either as flue cinder or as a concentrate obtained in an intermediate step such as eletrowinning of zinc. In recent years, indium is also recovered in pure form from waste compound semiconductors. To purify the indium feed, three methods are commonly used and they are electrolysis, vacuum distillation and zoning.

The metallic indium obtained by electrolysis or vacuum distillation is about 99.99% pure and contains at least 0.5 ppm each of impurities such as Si, Fe, Ni, Cu, Ga and Pb. The purification from waste compound semiconductors has the problem that large equipment and prolonged time are needed to separate and recover indium.

In the zone purification method, the purified indium mass has to be cut and there is a potential hazard of contamination; hence, the purification process inevitably suffers limited throughput and lowered yield. In addition, when the purified indium is cast into an ingot, impurities may enter during casting to cause contamination.

With a view to solving these problems, the present inventors previously developed an improved technology for purifying indium to a purity of at least 99.9999% by vacuum distillation and proposed it in Japanese Patent Application No. 8-294430. As it turned out, this technology had the problem that purification became more difficult as the difference between the vapor pressures of the metal of interest and impurity elements decreased. Hence, it was desired to develop a purification technology that was capable of producing indium of higher purity with higher efficiency and which was also applicable to the similar metals mentioned above.

SUMMARY OF THE INVENTION

An object, therefore, of the present invention is to provide an enhanced purification method by which even an indium feed containing many impurity elements can be purified consistently and at high speed to a purity of 99.9999% or higher and which is also applicable to the above-mentioned similar metals to yield equally purified products.

Another object of the invention is to provide an apparatus for purification that can be used to implement the method.

The present inventors conducted intensive studies in order to attain the stated objects by a two-step process in which the indium in an indium feed was evaporated and then condensed for recovery in the first thermal purification step to be separated from impurity elements of lower vapor pressure and in which the recovered indium was then heated in the second thermal purification step to evaporate away impurity elements of higher vapor pressure. As a result, they found that not only the impurity elements having lower vapor pressure than indium but also those having higher vapor, pressure could be separated in a consistent and efficient manner to yield indium with a purity of about 99.9999% or higher. They also found that by using graphite as the constituent material of areas which were to be contacted by indium during the purification process, in particular, the inner tube and by providing diffuser plates in the pathway of distillation in the second thermal purification step, recontamination could be prevented and the purification speed could be markedly improved. The inventors also found that this technology was applicable not only to indium but also to other metals that could be purified by the difference in vapor pressure, in particular, the similar metals mentioned above.

DETAILED DESCRIPTION OF THE INVENTION

Figure 1:
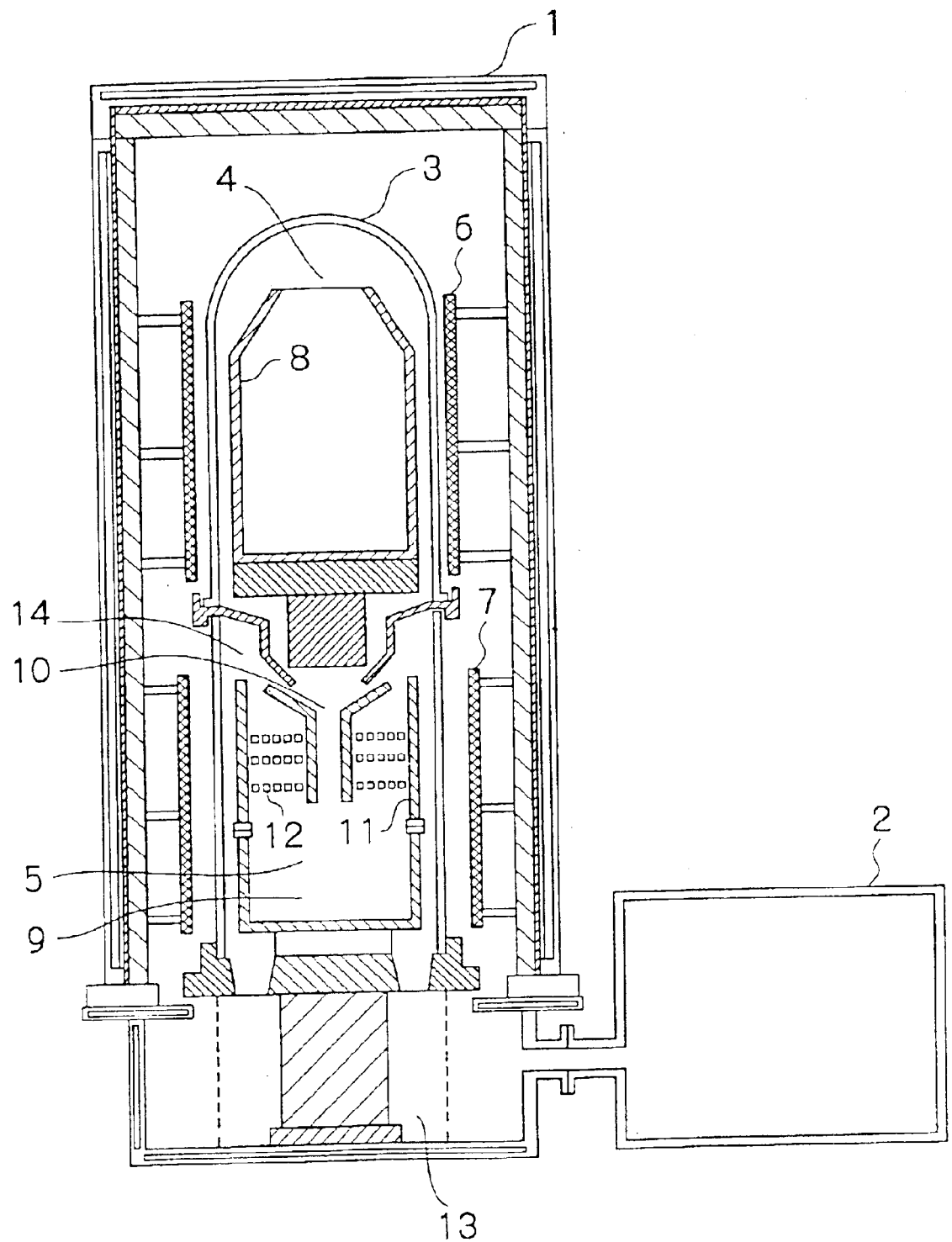
FIG. 1 is a schematic vertical section of an apparatus for purifying indium according to the present invention.

The present invention provides the following methods according to its first aspect:

1. A method of enhanced purification of high-purity metals which comprises purifying a metal feed by distillation in a vacuum atmosphere to yield the desired metal with high purity, which method further comprising a first thermal purification step in which said metal feed in a feed crucible positioned in the upper interior of an inner tube maintaining said vacuum atmosphere is heated and the generated vapor of said desired metal is brought into contact with the inner surface of said inner tube so that it is condensed and recovered in a separate form from impurity elements that have lower vapor pressure than said desired metal and which are allowed to stay within said feed crucible, and a second thermal purification step in which said desired metal as recovered is admitted into and heated in a liquid reservoir in the lower part of a tubular member positioned in the lower interior of said inner tube and the generated vapor is passed through a diffuser positioned in the upper part of said tubular member and guided by suction so that the vapors of impurity elements having higher vapor pressure than said desired metal are solidified in a separate form in a cooling trap positioned below said tubular member and the vapor of said desired metal is brought into contact with said diffuser so that it is condensed and returned to said liquid reservoir.
2. The method according to item 1, wherein said diffuser is made of a carbonaceous material.
3. The method according to item 1 or 2, wherein said liquid reservoir is a recovery mold for casting said desired metal having high purity after enhanced purification.
4. The method according to any one of items 1–3, wherein said desired metal is indium, said metal feed is heated at 1100–1300° C. in the first thermal purification step and said desired metal as recovered is heated at 900–1200° C. in the second thermal purification step.
5. The method according to any one of items 1–3, wherein said desired metal is at least one metal selected from the group consisting of antimony, zinc, tellurium, magnesium, cadmium, bismuth and silver.

According to its second object, the present invention provides the following apparatus:

6. An apparatus for enhanced purification of high-purity metals, which comprises an inner tube in which a vacuum atmosphere is to be formed, a first heating chamber provided in the upper interior of said inner tube, a second heating chamber provided in the lower interior of said inner tube, said first heating chamber accommodating a feed crucible with an open top into which a metal feed is charged and the desired metal in said metal feed is evaporated for recovery while impurity elements having lower vapor pressure than said desired metal are separated by being allowed to stay within said feed crucible, said second heating chamber accommodating a tubular member having in the top an inlet for receiving said desired metal as recovered and an outlet through which impurity elements that have higher vapor pressure than said desired metal and which are evaporated in separate form upon heating are discharged, as well as a liquid reservoir for heating said desired metal which is formed in the lower part of said tubular member, and a diffuser for condensing said desired metal as evaporated which is installed across the upper part of said tubular member.
7. The apparatus according to item 6, wherein said inner tube is surrounded by an outer tube of a larger diameter that permits said vacuum atmosphere to communicate with said inner tube and which is generally concentric therewith, said apparatus further including an upper heater and a lower heater provided in the space between the inner surface of said outer tube and the outer surface of said inner tube, said upper heater being positioned in the upper part of said space to heat said feed crucible and said lower heater being positioned in the lower part of said space to heat said liquid reservoir.
8. The apparatus according to item 6 or 7, wherein said diffuser consists of a plurality of generally parallel plates each having a plurality of holes made through it.
9. The apparatus according to any one of items 6–8, wherein at least the inner surface of the ceiling of said inner tube is domed or made conical in shape.
10. The apparatus according to any one of items 6–9, wherein said desired metal is at least one metal selected from the group consisting of indium, antimony, zinc, tellurium, magnesium, cadmium, bismuth and silver.

The apparatus for enhanced purification of high-purity metals according to the invention may be designed to have a layout as shown schematically in vertical section in FIG. 1. To be more specific, the apparatus has an outer tube 1 that is composed of a stainless steel frame, water-cooled areas and heat insulators such as alumina sheets and which has its inner surfaces made of a heat-insulating carbon material. The inner space of the outer tube 1 maintains a vacuum atmosphere by means of a vacuum pump 2. A smaller-diameter graphite inner tube 3 which is generally concentric with the outer tube 1 is inserted into the latter and the inner spaces of the two tubes communicate with each other so that the inner space of the graphite inner tube 3 also maintains a vacuum atmosphere. The ceiling of the inner tube 3 preferably has at least its inner surface domed or made conical in shape. By this design, the metal of interest evaporating from within the feed crucible 8 contacts the inner surface of the ceiling of the inner tube 3 and then condenses in the form of drops deposited on the inner surface of the ceiling; the drops are pulled by surface tension to run rapidly down the inner surfaces of the sidewalls instead of just falling down from the inner surface of the ceiling of the inner tube 3 to come back into the feed crucible 8. The inner tube 3 has a first heating chamber 4 in its upper part and a second heating chamber 5 in its lower part that communicates with the first heating chamber 4. An upper carbon heater 6 for heating the first heating chamber 4 and a lower carbon heater 7 for heating the second heating chamber 5 are provided in the space between the inner surface of the outer tube 1 and the outer surface of the inner tube 3. The feed crucible 8 made of graphite is provided within the first heating chamber 4 and a tubular member 11 is provided within the second heating chamber 5; the tubular member 11 has a liquid reservoir 9 in the lower part and is open in the center and periphery of its top to be fitted with a inwardly funnel-shaped inlet 10.

Diffusers 12 are provided across the upper part of the tubular member 11 to extend from its inner surface to the funnel-shaped inlet 10. The diffusers 12 may be plates having through-holes or they may be packed layers having large voids penetrating through them. In short, while various impurity elements are evaporated by heating in the tubular member 11 to generate convecting vapors, the vapors of those impurity elements having higher vapor pressure than indium pass through the diffusers 12 to be discharged out of the second heating chamber whereas the vapor of indium condenses on the diffusers 12 and drips back to the liquid reservoir 9; in this way, the impurity elements having higher vapor pressure than indium are removed. The diffusers 12 are preferably made of a material that is not highly reactive with metals and more preferably made of graphite throughout. The required number of diffusers 12, the diameter and number of through-holes in each diffuser plate, the spacing between adjacent plates, etc. may be adjusted in accordance with the purification speed, the concentrations of impurities, the heating temperature, etc. The through-holes in each diffuser plate may be clogged by a metal solidified from a vapor state if they are too small in diameter or number. Hence, the through-holes are preferably at least 2 mm in diameter. A cooling trap 13 is provided below the inner tube 3 in the neighborhood of the suction port of the vacuum pump 2; by means of this cooling trap 13, vacuum intake containing the vapors of impurity elements having higher vapor pressure than indium, namely, the vapors generated in the first heating chamber but not condensed and the vapors discharged from the second heating chamber are cooled to trap the residual vapors in separate form.

The term "vacuum atmosphere" as used herein means a highly evacuated state which is preferably represented by the degree of vacuum not higher than a pressure of $1 \times 10^{-3}$ Torr ($1.3 \times 10^{-1}$ Pa), more preferably a pressure in the range of from $1 \times 10^{-3}$ to $1 \times 10^{-6}$ Torr ($1.3 \times 10^{-1}$~$1.3 \times 10^{-4}$ Pa). A suitable amount of an indium feed (with a purity of about 99.99%) is charged into the feed crucible 8 in the first heating chamber 4 and heated by the upper carbon heater 6 to a temperature between 1100–1300° C., preferably between 1200 and 1280° C., in a vacuum atmosphere; the indium feed in the feed crucible 8 evaporates, condenses principally on the inner surfaces of the inner tube 3 and drips through the funnel-shaped inlet 10 into the liquid reservoir 9 in the lower part of the tubular member 11 in the second heating chamber 5 communicating with the lower part of the first heating chamber 4. If the pressure in the first heating chamber 4 is higher than $1 \times 10^{-3}$ Torr ($1.3 \times 10^{-1}$ Pa) or if the heating temperature is less than 1100° C., the evaporation of indium slows down to lower the rate of its purification. If the heating temperature exceeds 1300° C., the impurity elements having lower vapor pressure than indium evaporate in increasing amounts and get into the liquid reservoir 9 together with indium, making indium purification difficult to continue.

Among the various impurity elements contained in the indium feed, aluminum, silicon, iron, nickel, copper and gallium having lower vapor pressure than indium stay within the feed crucible 8. On the other hand, phosphorus, sulfur, chlorine, potassium, calcium, zinc, arsenic, cadmium and lead having higher vapor pressure than indium evaporate from within the feed crucible, condense within the first heating chamber 4 together with indium and drip through the inlet 10 to get into the liquid reservoir 9. Further purification of indium has been substantially impossible by the prior art. To overcome this difficulty, the present invention applies a special treatment to the indium recovered condensed in the liquid reservoir 9. In the second heating chamber 5, the liquid reservoir 9 is maintained at a temperature in the range of 900–1200° C., preferably 1050–1150° C., by means of the lower carbon heater 7, whereby the vapors of the impurity elements having higher vapor pressure than indium that have been generated to convect in the liquid reservoir 9 pass through the diffuser plates 12 to be discharged from the system whereas the indium vapor condenses upon contact with the diffuser plates 12 and drips again into the liquid reservoir 9. If the heating temperature in the second heating chamber is less than 900° C., the evaporation of the impurities to be removed slows down; if the heating temperature exceeds 1200° C., the evaporation of indium increases abruptly. As will be described later in Comparative Example 1, even if the diffuser plates 12 are absent from the interior of the tubular member 11, the impurity elements having higher vapor pressure than indium evaporate from the recovered indium mass in the liquid reservoir 9 and can be removed to some extent. However, by installing the diffuser plates 12 across the upper part of the tubular member 11, evaporation, convection and condensation of indium are effectively performed so that not only the surface layer of the recovered indium mass in the liquid reservoir 9 but also its entire bulk is circulated, whereby the impurity elements having higher vapor pressure are evaporated from the entire part of the recovered indium mass to achieve higher yield in purification. Above all, the indium which evaporates accompanying the impurity elements having higher vapor pressure can be recondensed on the diffuser plates 12 so that the loss of the recovered indium mass from the liquid reservoir 9 that can occur during the purification process is suppressed to a minimum industrially feasible level.

In the present invention, the shape of the inner surface of the liquid reservoir 9 is designed to be the same as that of a recovery mold which is to be used in the step subsequent to the first and second thermal purification steps (herein referred to as "after enhanced purification"). This eliminates the need of the prior art technology for remelting the purified indium to be cast into an ingot and recontamination by the casting operation is effectively prevented to yield satisfactorily purified indium. Conventionally, quartz is often used as the refractory material of the inner tube 3; in the present invention, the inner tube 3 and the diffuser plates 12 are preferably made of graphite and, more preferably, substantially all surfaces that are to be contacted by indium in a gaseous and a liquid form in a vacuum atmosphere, particularly at least the inner surfaces of the inner tube 3, the upper heater 6, the lower heater 7, the diffuser plates 12 and the like are made of high-purity graphite in order to prevent indium contamination. The shift from quartz to graphite as the constituent material of the inner tube 3 has the added advantage that the temperature the inner tube 3 can withstand and, hence, the heating temperature in it can be elevated to increase the rate of indium purification. What is more, the thermal conductivity of the inner tube 3 is also increased. Thus, as will be described later in Example 2, the rate of condensation and, hence, the rate of indium purification can be increased given the same heating temperature. A comparative test was performed to determine the rate of indium purification at 1150° C., 1250° C. and 1300° C. using two types of inner tube 3, one being made of graphite and the other made of quartz. As shown in Table 2 (see Example 2 and Comparative Example 2), the rate of indium purification was 2.95 g/min (graphite) and 0.8 g/min (quartz) at 1150° C., 10.4 g/min (graphite) and 8.7 g/min (quartz) at 1250° C., and 15.2 g/min (graphite) and 13.3 g/min (quartz).

The indium thus obtained by enhanced purification was analyzed with a glow discharge mass spectrometer and the total of the impurities present was no more than 1 ppm. To determine the purity of indium, the impurity elements to be measured are subjected to quantitative analysis with a glow discharge mass spectrometer and the total sum of the impurity contents is subtracted from 100%.

It should be noted that the method and apparatus for enhanced purification of the invention are applicable not only to indium but also to all other metals that can be purified by the difference in vapor pressure, as exemplified by antimony, zinc, tellurium, magnesium, cadmium, bismuth and silver.

The present invention is further illustrated by reference to the following examples which are by no means intended to limit the scope of the invention.

EXAMPLE 1

FIG. 1 is a schematic vertical section of the apparatus used in the examples to perform enhanced purification of indium. It had a graphite inner tube 3 containing a graphite feed crucible 8 in its upper part and a graphite tubular member 11 in the lower part. The tubular member 11 had in its open top a funnel-shaped inlet 10 through which indium would drip into the second heating chamber 5 in the tubular member 11 after condensing in the first heating chamber 4. The lower part of the tubular member 11 was the liquid reservoir 9 and the upper periphery of the tubular member 11 was open to serve as an outlet through which to discharge the vapors of the impurity elements having higher vapor pressure which evaporated from the recovered indium mass in the liquid reservoir 9. In the upper part of the tubular member 11, graphite diffuser plates 12 were installed between the inner surface of the tubular member 11 and the outer surface of the funnel-shaped inlet 10. The diffuser plates 12 were detachable to facilitate the removal of deposits and replacement after use. An outer tube 1 generally concentric with the inner tube 3 was slipped over it and carbon heaters 6 and 7 were installed in the upper and lower parts, respectively, of the space between the inner and outer tubes.

Seven kilograms of a metallic indium feed having the assay shown in Table 1 was charged into the feed crucible 8 and the interior of the crucible was evacuated through the outer tube 1 and the inner tube 3 by means of a vacuum pump 2 so that the degree of vacuum in the crucible was at a pressure of $1 \times 10^{-4}$ Torr ($1.3 \times 10^{-2}$ Pa). At the same time, the metallic indium feed was heated to 1250° C. with the upper carbon heater 6 so as to evaporate indium and the impurity elements having higher vapor pressure. As a result of this first thermal purification step, the evaporating indium condensed upon contact with the inner surfaces of the inner tube 3 and dripped through the funnel-shaped inlet 10 to be recovered in the liquid reservoir 9 in the lower part of the tubular member 11.

Part of the impurity elements having higher vapor pressure than indium did not condense but remained in a vapor phase and were aspirated by the vacuum pump 2 so that it passed through an intake port 14 to solidify in a cooling trap 13 provided below the inner tube 3 in the neighborhood of the suction port of the vacuum pump 2. The solidified product was mainly composed of indium, with the remainder consisting of phosphorus, sulfur, chlorine, lead and other impurity elements having higher vapor pressure than indium. The residue in the feed crucible 8 was chiefly composed of indium, with the remainder consisting of highly concentrated silicon, iron, nickel, copper, gallium and other impurity elements having lower vapor pressure than indium.

Since the recovered indium mass in the tubular member 1 contained part of the impurity elements having higher vapor pressure than indium, the second thermal purification step was performed to remove such impurity elements. To this end, the recovered indium mass in the liquid reservoir 9 was heated to 1100° C. by the lower carbon heater 7 and the generated convecting vapors of the impurity elements having higher vapor pressure than indium were passed through the graphite diffuser plates 12 to be discharged from the system whereas the indium vapor was recondensed by contact with the graphite diffuser plates 12 so that it was recovered as purified indium. By 7-hour purification procedure, purified indium was obtained in an amount of 6 kg and analyzed to give the result shown in Table 1 (see the data for Example 1). The result of analysis for Comparative Example 1 is also shown in Table 1.

heating temperature in the first thermal purification step was varied at 1150° C., 1250° C. and 1300° C. and that the duration of the second thermal purification step was 15 hours. In each of the three test runs, indium could be purified to a purity of at least 99.9999%. The respective rates of indium purification are shown in Table 2 below together with the result of Comparative Example 2.

TABLE 2

| | Rates of indium purification | |
|---|---|---|
| Temperature | Example 2 | Comparative Example 2 |
| 1150° C. | 2.95 g/min | 0.8 g/min |
| 1250° C. | 10.4 g/min | 8.7 g/min |
| 1300° C. | 15.2 g/min | 13.3 g/min |

Comparative Example 2

For comparison with Example 2, purification tests were conducted under the same conditions as in Example 2 by the method described in Example 1 of Japanese Patent Application No. 8-294430. The rates of indium purification that could be achieved are shown in Table 2 (see the data for Comparative Example 2). In Comparative Example 2, the contents of impurities, particularly those having higher vapor pressure than indium, were higher than in Example 1 but it was at least possible to produce indium having a purity

TABLE 1

Analyses of impurities in the indium feed and the purified indium (by glow discharge mass spectrometer; unit, ppm)

| | F | P | Si | S | Cl | Fe | Ni | Cu | Ga | Sb | Pb |
|---|---|---|---|---|---|---|---|---|---|---|---|
| Feed | 0.24 | 0.01 | 0.14 | 0.02 | 0.45 | 0.15 | 2.3 | 0.28 | 0.03 | 0.02 | 0.2 |
| Example 1 | <0.01 | <0.01 | 0.03 | <0.01 | 0.01 | <0.01 | <0.01 | <0.01 | <0.01 | <0.01 | 0.01 |
| Comparative Example 1 | <0.01 | <0.01 | 0.12 | <0.01 | 0.01 | <0.01 | <0.01 | <0.01 | 0.03 | 0.01 | 0.13 |

Comparative Example 1

For comparison with Example 1, indium was purified by repeating the procedure of Example 1 except that the diffuser plates 12 were omitted and the result of analysis of the purified product is shown in Table 1 (see the data for Comparative Example 1). Without diffuser plates, indium purification could at least be accomplished; however, it was only the surface layer of the recovered indium mass in the liquid reservoir 9 that was principally purified and compared to Example 1 in which all of the recovered indium mass in the liquid reservoir 9 was purified, the performance in removing the impurities was limited and the difference was particularly noticeable for lead and other impurity elements having close enough vapor pressures to indium. What is more, in Comparative Example 1, the indium vapor coming from the recovered indium mass in the liquid reservoir 9 in the lower part of the tubular member 11 could not be condensed again for recovery and indium loss was so great that industrially applicable indium purification was difficult to perform.

EXAMPLE 2

Twenty kilograms of 99.99% pure metallic indium feed was charged into the feed crucible 8 and subjected to the same purification procedure as in Example 1, except that the of 99.9999% and more. However, the use of the quartz inner tube in Comparative Example 2 caused contamination by silicon and, in addition, due to the poor thermal conductivity of quartz, the indium vapor condensed so slowly that this was a rate-limiting factor in the purification process to realize only a slow rate of indium purification.

According to the present invention, not only impurity elements having lower vapor pressure than indium but also those having higher vapor pressure can be positively separated from indium, so high-purity indium with a purity of about 99.9999% or more can consistently be obtained with the additional advantage of preventing the loss of indium that may occur during its purification.

If desired, at least part, preferably all, of the inner surfaces of the purifying apparatus which are to be contacted by indium may in effect be formed of high-purity graphite and this contributes to preventing contamination by the constituent material of the apparatus. If necessary, the liquid reservoir 9 may be an indium recovery mold and this is effective in preventing recontamination that may occur during the steps of purifying and castling indium conventionally, the inner tube has been made of quartz but quartz has low softening point and reacts with indium at elevated temperatures. By forming the inner tube of graphite, the problem of contamination is resolved and, what is more, the heat resistance and thermal conductivity of the inner tube are so much increased that the indium purification temperature and rate are sufficiently increased to achieve a remarkable improvement in productivity.

In addition to indium, the similar metals such as antimony, zinc, tellurium, magnesium, cadmium, bismuth and silver can be purified by the method of the invention relying upon the difference in vapor pressure and equally good results are obtained with these metals.

If a vacuum atmosphere is created in the outer tube as well as in the inner tube, the following advantages are obtained: (1) sufficient heat insulation is provided to save the cost of energy; (2) the problem of the heat capacity and convection around the heaters is resolved to permit easy control of the temperature in the heating chambers; and (3) the oxidative corrosion of the heaters is significantly reduced.

What is claimed is:

1. An apparatus for enhanced purification of high-purity metals, which comprises an inner tube in which a vacuum atmosphere is to be formed, a first heating chamber provided in an upper interior of said inner tube, a second heating chamber provided in a lower interior of said inner tube, said first heating chamber accommodating a feed crucible with an open top into which a metal feed is charged and a desired metal in said metal feed is evaporated for recovery while impurity elements having a lower vapor pressure than said desired metal are separated by being allowed to stay within said feed crucible, said second heating chamber accommodating a tubular member having in a top thereof an inlet for receiving said desired metal as recovered and an outlet through which impurity elements that have a higher vapor pressure than said desired metal and which are evaporated in separate form upon heating are discharged, as well as a liquid reservoir for heating said desired metal which is formed in a lower part of said tubular member, and a diffuser for condensing said desired metal as evaporated, which is installed across an upper part of said tubular member.

2. The apparatus according to claim 1, which further comprises an outer tube, said inner tube is surrounded by the outer tube which has a larger diameter than the inner tube that permits said vacuum atmosphere to communicate with said inner tube and which is generally concentric therewith, said apparatus further including an upper heater and a lower heater provided in a space between an inner surface of said outer tube and an outer surface of said inner tube, said upper heater being positioned in an upper part of said space to heat said feed crucible, and said lower heater being positioned in a lower part of said space to heat said liquid reservoir.

3. The apparatus according to claim 1, wherein said diffuser consists of a plurality of generally parallel plates, each having a plurality of holes therethrough.

4. The apparatus according to claim 1, wherein at least an inner surface of a ceiling of said inner tube is domed or conical in shape.

5. The apparatus according to claim 3, wherein at least an inner surface of a ceiling of said inner tube is domed or conical in shape.

6. An apparatus for enhanced purification of high-purity metals, which comprises an inner tube in which a vacuum atmosphere is to be formed, a first heating chamber provided in an upper interior of said inner tube, a second heating chamber provided in a lower interior of said inner tube, said first heating chamber accommodating a feed crucible with an open top into which a metal feed is charged and a desired metal in said metal feed is evaporated for recovery while impurity elements having a lower vapor pressure than said desired metal are separated by being allowed to stay within said feed crucible, said second heating chamber accommodating a tubular member having in a top thereof an inlet for receiving said desired metal as recovered and an outlet through which impurity elements that have a higher vapor pressure than said desired metal and which are evaporated in separate form upon heating are discharged, as well as a liquid reservoir for heating said desired metal which is formed in a lower part of said tubular member, and a diffuser for condensing said desired metal as evaporated, which is installed across the upper part of said tubular member, wherein said desired metal is at least one metal selected from the group consisting of indium, antimony, zinc, tellurium, magnesium, cadmium, bismuth and silver.

7. An apparatus for enhanced purification of high-purity metals, which comprises an inner tube in which a vacuum atmosphere is to be formed, a first heating chamber provided in an upper interior of said inner tube, a second heating chamber provided in a lower interior of said inner tube, said first heating chamber accommodating a feed crucible with an open top into which a metal feed is charged and a desired metal in said metal feed is evaporated for recovery while impurity elements having a lower vapor pressure than said desired metal are separated by being allowed to stay within said feed crucible, said second heating chamber accommodating a tubular member having in a top thereof an inlet for receiving said desired metal as recovered and an outlet through which impurity elements that have a higher vapor pressure than said desired metal and which are evaporated in separate form upon heating are discharged, as well as a liquid reservoir for heating said desired metal which is formed in a lower part of said tubular member, and a diffuser for condensing said desired metal as evaporated, which is installed across an upper part of said tubular member, wherein said diffuser consists of a plurality of generally parallel plates, each having a plurality of holes therethrough, and wherein said desired metal is at least one metal selected from the group consisting of indium, antimony, zinc, tellurium, magnesium, cadmium, bismuth and silver.

8. An apparatus for enhanced purification of high-purity metals, which comprises an inner tube in which a vacuum atmosphere is to be formed, a first heating chamber provided in an upper interior of said inner tube, a second heating chamber provided in a lower interior of said inner tube, said first heating chamber accommodating a feed crucible with an open top into which a metal feed is charged and a desired metal in said metal feed is evaporated for recovery while impurity elements having a lower vapor pressure than said desired metal are separated by being allowed to stay within said feed crucible, said second heating chamber accommodating a tubular member having in a top thereof an inlet for receiving said desired metal as recovered and an outlet through which impurity elements that have a higher vapor pressure than said desired metal and which are evaporated in separate form upon heating are discharged, as well as a liquid reservoir for heating said desired metal which is formed in a lower part of said tubular member, and a diffuser for condensing said desired metal as evaporated, which is installed across an upper part of said tubular member, wherein at least an inner surface of a ceiling of said inner tube is domed or conical in shape, and wherein said desired metal is at least one metal selected from the group consisting of indium, antimony, zinc, tellurium, magnesium, cadmium, bismuth and silver.

9. The apparatus according to claim 2, wherein said diffuser consists of a plurality of generally parallel plates, each having a plurality of holes therethrough.

10. The apparatus according to claim 9, wherein at least an inner surface of a ceiling of said inner tube is domed or conical in shape.

11. The apparatus according to claim 2, wherein at least an inner surface of a ceiling of said inner tube is domed or conical in shape.

12. An apparatus for enhanced purification of high-purity metals, which comprises an inner tube in which a vacuum atmosphere is to be formed, a first heating chamber provided in an upper interior of said inner tube, a second heating chamber provided in a lower interior of said inner tube, said first heating chamber accommodating a feed crucible with an open top into which a metal feed is charged and a desired metal in said metal feed is evaporated for recovery while impurity elements having a lower vapor pressure than said desired metal are separated by being allowed to stay within said feed crucible, said second heating chamber accommodating a tubular member having in a top thereof an inlet for receiving said desired metal as recovered and an outlet through which impurity elements that have a higher vapor pressure than said desired metal and which are evaporated in separate form upon heating are discharged, as well as a liquid reservoir for heating said desired metal which is formed in a lower part of said tubular member, and a diffuser for condensing said desired metal as evaporated, which is installed across an upper part of said tubular member, wherein said inner tube is surrounded by an outer tube which has a larger diameter than the inner tube that permits said vacuum atmosphere to communicate with said inner tube and which is generally concentric therewith, an upper heater and a lower heater provided in a space between an inner surface of said outer tube and an outer surface of said inner tube, said upper heater being positioned in an upper part of said space to heat said feed crucible, and said lower heater being positioned in a lower part of said space to heat said liquid reservoir, wherein at least part of an inner surface of a ceiling of said inner tube is domed or conical in share, and wherein said desired metal is at least one metal selected from the group consisting of indium, antimony, zinc, tellurium, magnesium, cadmium, bismuth and silver.

13. An apparatus for enhanced purification of high-purity metals, which comprises an inner tube in which a vacuum atmosphere is to be formed, a first heating chamber provided in an upper interior of said inner tube, a second heating chamber provided in a lower interior of said inner tube, said first heating chamber accommodating a feed crucible with an open top into which a metal feed is charged and a desired metal in said metal feed is evaporated for recovery while impurity elements having a lower vapor pressure than said desired metal are separated by being allowed to stay within said feed crucible, said second heating chamber accommodating a tubular member having in a top thereof an inlet for receiving said desired metal as recovered and an outlet through which impurity elements that have a higher vapor pressure than said desired metal and which are evaporated in separate form upon heating are discharged, as well as a liquid reservoir for heating said desired metal which is formed in a lower part of said tubular member, and a diffuser for condensing said desired metal as evaporated, which is installed across an upper part of said tubular member, wherein said inner tube is surrounded by an outer tube which has a larger diameter than the inner tube that permits said vacuum atmosphere to communicate with said inner tube and which is generally concentric therewith, an upper heater and a lower heater provided in a space between an inner surface of said outer tube and an outer surface of said inner tube, said upper heater being positioned in an upper part of said space to heat said feed crucible and said lower heater being positioned in a lower part of said space to heat said liquid reservoir, and wherein said desired metal is at least one metal selected from the group consisting of indium, antimony, zinc, tellurium, magnesium, cadmium, bismuth and silver.

* * * * *